(12) United States Patent
Hilton

(10) Patent No.: US 8,161,476 B2
(45) Date of Patent: Apr. 17, 2012

(54) PROCESSOR EXCLUSIVITY IN A PARTITIONED SYSTEM

(75) Inventor: Ronald N. Hilton, Holladay, UT (US)

(73) Assignee: International Business Machines Corporation, Armonk, NY (US)

( * ) Notice: Subject to any disclaimer, the term of this patent is extended or adjusted under 35 U.S.C. 154(b) by 1321 days.

(21) Appl. No.: 11/773,421

(22) Filed: Jul. 4, 2007

(65) Prior Publication Data

US 2009/0013153 A1    Jan. 8, 2009

(51) Int. Cl.
*G06F 9/455* (2006.01)
(52) U.S. Cl. .......................................... 718/1
(58) Field of Classification Search .................. None
See application file for complete search history.

(56) References Cited

U.S. PATENT DOCUMENTS

| | | | | |
|---|---|---|---|---|
| 5,291,599 A * | 3/1994 | Cohen et al. | ............ | 718/102 |
| 2003/0069972 A1 * | 4/2003 | Yoshimura et al. | ............ | 709/226 |
| 2005/0004879 A1 * | 1/2005 | Mathias et al. | ............ | 705/400 |
| 2006/0107000 A1 * | 5/2006 | Jung-Ik et al. | ............ | 711/153 |
| 2006/0130062 A1 * | 6/2006 | Burdick et al. | ............ | 718/100 |
| 2008/0034366 A1 * | 2/2008 | Tanaka et al. | ............ | 718/1 |

* cited by examiner

*Primary Examiner* — Emerson Puente
*Assistant Examiner* — Gregory Kessler
(74) *Attorney, Agent, or Firm* — Steven Chiu, Esq.; Blanche E. Schiller, Esq.; Heslin Rothenberg Farley & Mesiti P.C.

(57) ABSTRACT

A computer system including a plurality of physical processors (CPs) having physical processor performances (PCPs), a plurality of logical processors (LCPs), a plurality of logical partitions (LPARs) where each partition includes one or more of the logical processors (LCPs), and a system assist processor having a control element. The control element controls the virtualization of the physical processors (CPs), the logical partitions (LPARs) and the logical processors (LCPs) and allocates the physical processor performances (PCPs) to the logical partitions (LPARs). The control element operates to exclusively bind logical processors (LCPs) to the physical processors (CPs). For a logical processor (LCP) exclusively bound to a physical processor (CP), the logical processor (LCP) has exclusive use of the underlying physical processor (CP) and no other logical processor (LCP) can be dispatched on the underlying physical processor (CP) even if the underlying physical processor (CP) is otherwise available.

18 Claims, 9 Drawing Sheets

FIG 4

| LOGICAL PARTITION | LOGICAL CPU | PHYSICAL CPU | EXCLUSIVE CONTROL | MEMORY | I/O | OTHER |
|---|---|---|---|---|---|---|
| LPAR1 | $LCP1_1$ | CP01 | No | M1 | I/O1 | O1 |
| LPAR1 | $LCP2_1$ | CP02 | No | M1 | I/O1 | O1 |
| LPAR1 | $LCP3_1$ | CP03 | No | M1 | I/O1 | O1 |
| LPAR1 | $LCP4_1$ | CP04 | No | M1 | I/O1 | O1 |
| LPAR2 | $LCP1_2$ | CP02 | No | M2 | I/O2 | O2 |
| LPAR2 | $LCP2_2$ | CP04 | No | M2 | I/O2 | O2 |
| LPAR3 | $LCP1_3$ | CP01 | No | M3 | I/O3 | O3 |
| LPAR4 | $LCP1_4$ | CP05 | No | M4 | I/O4 | O4 |

FIG 5

| LOGICAL PARTITION | LOGICAL CPU | PHYSICAL CPU | EXCLUSIVE CONTROL | MEMORY | I/O | OTHER |
|---|---|---|---|---|---|---|
| LPAR 1 | $LCP1_1$ | CP02 | $CTL1_1$ | M1 | I/O1 | O1 |
| LPAR 1 | $LCP2_1$ | CP04 | $CTL1_2$ | M1 | I/O1 | O1 |
| LPAR 1 | $LCP3_1$ | CP05 | $CTL1_3$ | M1 | I/O1 | O1 |
| LPAR 1 | $LCP4_1$ | CP07 | $CTL1_4$ | M1 | I/O1 | O1 |
| LPAR 2 | $LCP1_2$ | CP03 | $CTL2_1$ | M2 | I/O2 | O2 |
| LPAR 2 | $LCP2_2$ | CP06 | $CTL2_2$ | M2 | I/O2 | O2 |
| LPAR 3 | $LCP1_3$ | CP01 | CTL3 | M3 | I/O3 | O3 |
| LPAR 4 | $LCP1_4$ | CP08 | CTL4 | M4 | I/O4 | O4 |

PROCESSOR EXCLUSIVITY IN A PARTITIONED SYSTEM

BACKGROUND OF THE INVENTION

This invention relates to the virtualization of computer systems and, in particular, to controlling and partitioning of logical processors in computer systems.

Varying degrees of processor virtualization are possible in computer systems providing advantages and disadvantages over the spectrum of possibilities. At one extreme of the spectrum are dedicated physical processors (CPs), which have the advantage of high hardware performance and low overhead, but have the disadvantage of inflexibility to meet varying workload demands. At the other extreme of the spectrum are logical processors (LCPs) with little or no affinity to the underlying physical resources, and therefore relatively high overhead due to context switching, cache dilution/thrashing, and hardware emulation as necessary. Between the spectrum extremes is processor affinity, where attempts are made to redispatch logical processors (LCPs) to the same physical processors (CPs) as frequently as possible. Redispatching logical processors (LCPs) to the same physical processors (CPs) helps to mitigate context switching and cache-thrashing overhead, although cache dilution and hardware-emulation overhead are still present to much the same degree by virtue of still having to share the same physical resources among the logical processors (LCPs).

One example of processor virtualization is described in the US Patent Application 20060107000 entitled PEER-BASED PARTITIONING METHOD FOR SYSTEM RESOURCE SHARING, published May 18, 2006. Therein, the physical resources of a system are divided into multiple logical partitions where each logical partition is a subset of the physical machine that acts as a virtual machine. A layer of software, called a "hypervisor," controls the interaction between the various virtual machines. Any time a virtual machine wants to access a shared, physical resource, it does so through the hypervisor. The hypervisor acts as a master-control program. Any time a logical partition wants access to a physical resource, it goes through the hypervisor. The hypervisor monitors and is actively involved with each logical partition at the expense of introducing overhead into the processing. In the partitioning method, the overhead is reduced by logically partitioning the computer system into multiple virtual machines where sets of physical resources are partitioned into sets of logical partitions. Logical partitions contain one or more physical processors where typically one of the processors is a controller of the logical partitions.

Virtualization of computer systems and, in particular, controlling and partitioning of logical processors in computer systems provides flexibility but often also adversely affects the overhead and efficiency of the system. One measure of the efficiency of a computer system is the number of cycles (clock cycles) utilized per instruction (CPI). The lower the CPI, the greater the efficiency of the computer system. Another measure of efficiency specifies overhead comparing the amount of time (MT) the computer system spends managing the system relative to the amount of time (ET) the computer system spends executing user instructions. Using these definitions, the overhead, OVERHEAD, is expressed as a percentage as follows:

$$\text{OVERHEAD} = \{(MT)/(MT+ET)\}(100).$$

While the peer-based partitioning method described is useful in reducing the overhead of processor virtualization, there is still a need for improved methods of and systems for processor virtualization with even greater reductions in overhead.

SUMMARY

The present invention is a computer system including a plurality of physical processors (CPs) having physical processor performances (PCPs), a plurality of logical processors (LCPs), a plurality of logical partitions (LPARs) where each partition includes one or more of the logical processors (LCPs), and a system assist processor (SAP) having a control element. The control element controls the virtualization of the physical processors (CPs), the logical partitions (LPARs) and the logical processors (LCPs) and allocates the physical processor performances (PCPs) to the logical partitions (LPARs). The control element operates to exclusively bind logical processors (LCPs) to the physical processors (CPs). For a logical processor (LCP) exclusively bound to a physical processor (CP), the logical processor (LCP) has exclusive use of the underlying physical processor (CP) and no other logical processor (LCP) can be dispatched on the underlying physical processor (CP) even if the underlying physical processor (CP) is other-wise available.

In one embodiment of the computer system, the control element includes partition resource maps for partitioning the computer system into the logical partitions that exclusively bind the logical processors to the physical processors.

In one embodiment of the computer system, the physical processors have physical processor performances and, for each logical partition, the control element assigns logical partition utilization values for the logical partition and controls the dispatching and undispatching of each logical processor of the logical partition based on the logical partition utilization values so as to enable logical processors of the logical partition to fractionally time-share physical processor performances. In a further embodiment, the dispatching and undispatching of each logical processor of the logical partition is based upon a first-come first-served basis among logical processors of the logical partition whereby logical processor utilization for each logical processor is a function of demands for processing from each logical processor.

In one embodiment of the computer system, the control element defines sharing intervals during which logical processors of logical partitions are dispatched and undispatched to physical processors and wherein the duration of dispatch times is accounted for to determine the utilization of each logical processor.

In one embodiment of the computer system, the control element sets a minimum, dispmin, for the logical partition utilization, dispcyc, and wherein the dispatching and undispatching of each logical processor of the logical partition is based upon a comparison of the minimum, dispmin, and the logical partition utilization, dispcyc, and sets a target, disptgt, for the logical partition utilization, dispcyc, and wherein the dispatching and undispatching of each logical processor of the logical partition is based upon a comparison of the target, disptgt, and the logical partition utilization, dispcyc.

In one embodiment, the computer system control element operates for exclusively binding all of the logical processors to different ones of the physical processors.

In one embodiment, the computer system control element for each logical partition establishes sharing intervals for the logical partition, establishes swap intervals during each sharing interval, dispatches and undispatches the logical processors to the physical processors for selected ones of the swap intervals, and accumulates a logical-partition utilization based on accumulated dispatch times for all logical processors of the logical partition over each sharing interval. Further, the computer system actual utilization is the sum of the logical-partition utilizations of all the logical partitions. Still further, the computer system actual system utilization does not exceed a total system utilization.

In one embodiment, the computer system control element accumulates a utilization time measuring a time that logical processors are dispatched to physical processors, establishes a minimum dispatch time and a target dispatch time for logical processors to be dispatched to physical processors, and (i) if the utilization time is less than the minimum dispatch time, dispatches a logical processors to a physical processor, (ii) if the utilization time is greater than the target dispatch time, undispatches a logical processors from a physical processor, (iii) if the utilization time is between the minimum dispatch time and the target dispatch time, and if in a WAIT state, undispatches a dispatched logical processor from a physical processor, or if not in a WAIT state, dispatches an undispatched logical processor to a physical processor.

The binding of a logical processor (LCP) with a physical processor (CP) has the advantage of essentially eliminating all forms of virtualization overhead while retaining the flexibility to meet changing workload demands.

The foregoing and other objects, features and advantages of the invention will be apparent from the following detailed description in conjunction with the drawings.

BRIEF DESCRIPTION OF THE DRAWINGS

FIG. 4 is a diagram of one embodiment of a partition resource map.

FIG. 5 is a diagram of another embodiment of a partition resource map.

DETAILED DESCRIPTION

Figure 1:
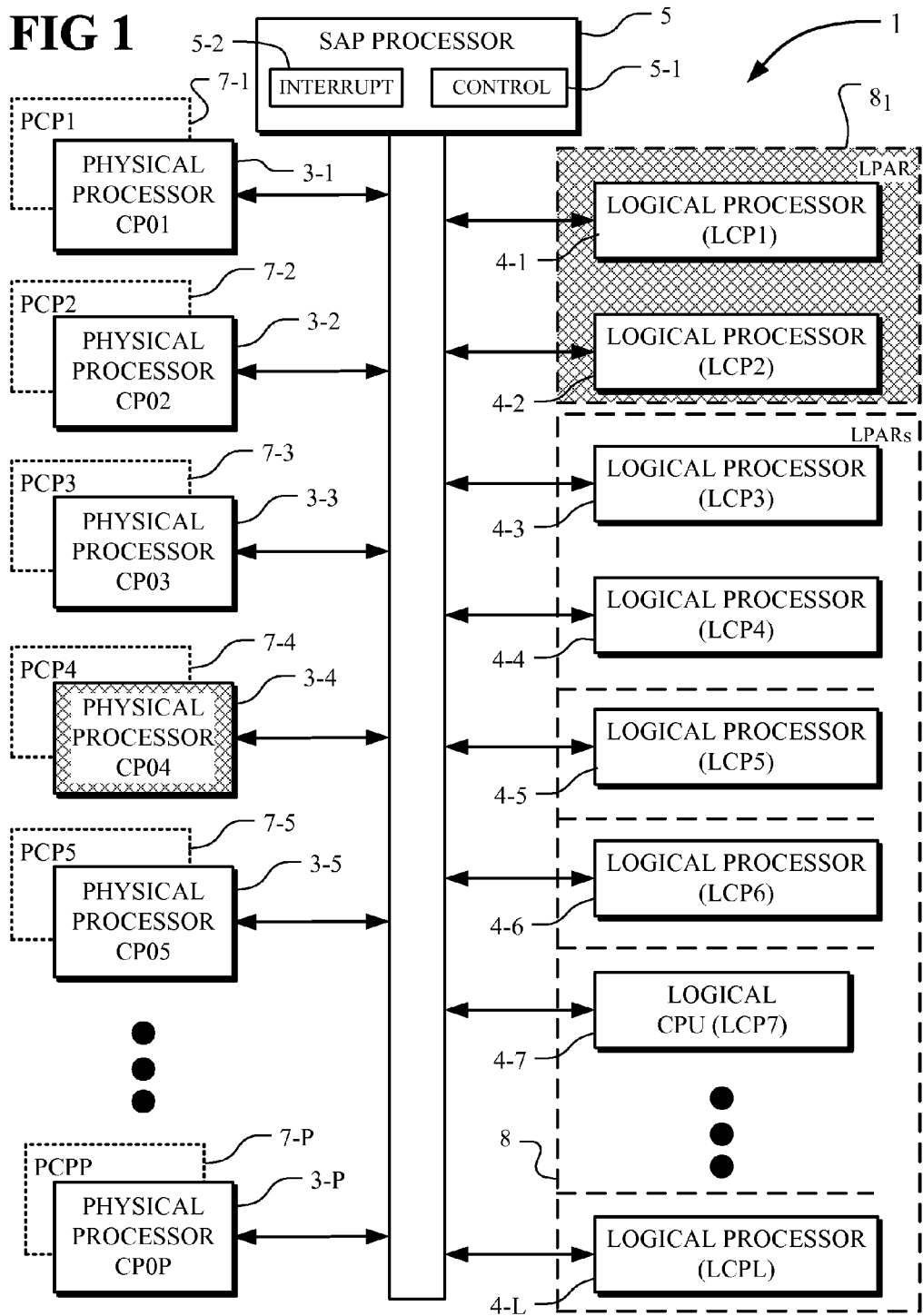
FIG. 1 depicts a block diagram of a central processing complex computer system having a plurality of physical processors (CP) providing physical processor performance (PCP), including a plurality of logical processors (LCP) for use in logical partitions (LPARs) and including a system assist processor (SAP).

In FIG. 1, a Central Processing Complex (CPC) computer system 1 includes physical processors (CPs) 3 and includes logical partitions (LPARs) 8 formed with logical processors (LCPs) 4. The logical partitioning, in the embodiment of FIG. 1, is under control of a system assist processor (SAP) 5 including a control element 5-1 and an interrupt facility 5-2. The interrupt facility is a well-known facility for processing interrupts in computer systems like the CPC computer system 1. The physical processors (CPs) 3 include the physical processors CP01, CP02, . . . , CP0P designated 3-1. 3-2, . . . , 3-P and the logical processors (LCPs) 4 include the logical processors LCP1, LCP2, . . . , LCPL designated 4-1, 4-2, . . . , 4-L. The physical processors CP01, CP02, . . . , CP0P each is a physical engine having the capability of executing a single processing thread (that is, executing with uniprocessor performance). The processing performances of the physical processors (CPs) 3 are designated as the physical processor performances (PCPs) 7 and include PCP1, PCP2, . . . , PCPP designated 7-1, 7-2, . . . , 7-P.

In the present specification, the terms "exclusive", "exclusive binding", "exclusivity", "exclusively binding" and similar terms derived from "exclusive" are used to denote the exclusive relationship between a single logical processor (LCP) and a single physical processor (CP). With exclusivity, a single logical processor (LCP) is dispatched to use all or any fraction of the full physical processor performance (PCP) capacity of a single CP, to the exclusion of all other logical processors (LCPs), and the operation includes fractional usage time-sharing accounting to control and measure the fractional amount of the physical processor's (CP's) full capacity that is actually used by the single logical processor (LCP). With exclusivity, no other logical processor (LCP) can be dispatched to the particular physical processor (CP) even if that particular physical processor (CP) is otherwise available. With exclusivity, no timesharing of the single physical processor (CP) is permitted and hence virtualization overhead is substantially reduced or eliminated.

In the present specification, the term "non-exclusive" and similar terms derived from "non-exclusive" are used to denote the relationship between a single logical processor (LCP) and a single physical processor (CP) where one or more logical processors (LCPs) are allocated to use the full capacity of a physical processor (CP). With non-exclusivity, if multiple logical processors (LCPs) are allocated to use the full capacity of a physical processor (CP), time-allocation is used among the multiple logical processors (LCPs) to apportion the full capacity time among the multiple logical processors (LCPs).

If a single logical processor (LCP) is allocated to use the full capacity of a physical processor (CP), time-sharing accounting is not needed. Where a single logical processor (LCP) is allocated to use the full capacity of a physical processor (CP), the relationship is termed "dedicated".

In FIG. 1, the logical processors (LCPs) 4 are logical (virtual) engines and each LCP 4 utilizes all or some fraction of a full physical processor performance (PCP) unit of processing 7, potentially time-sharing such a PCP with other LCPs. The sharing is fractional sharing where the fraction can be any value between 1 and 0, with 1 and 0 included. Under preferred operating conditions, at least one and possibly all of the physical processors (CPs) have exclusivity with a logical processor (LCP).

In FIG. 1, the system assist processor (SAP) 5 operates (i) to organize the physical processors (CPs) 3 including physical processors CP01, CP02, . . . , CP0P, (ii) to organize the logical processors (LCPs) 4 including the logical processors LCP1, LCP2, . . . , LCPL, and (iii) to organize the physical processor performances (PCPs) 7 including PCP1, PCP2, . . . , PCPP. The SAP processor 5 uses the logical and physical processors 3, 4 and 7 of FIG. 1 to create logical partitions (LPARs). In FIG. 1, LPAR $8_1$ includes logical processors LCP1 and LCP2 and other logical partitions LPARs 8 (not specifically designated in FIG. 1) include logical processors LCP3, . . . , LCPL. Further details relating to logical partitions are described hereinafter (see FIG. 2). The logical partitions (LPARs) 8 are logical (virtual) machines and each logical partition (LPAR) includes in addition to one or more logical processors (LCPs), other system resources (including memory, I/O and other facilities). Each logical partition (LPAR) presents a single system image to software.

In FIG. 1, the central processing complex computer system 1 is a logically partitioned physical machine with one or more physical processors 3 (CPs) and physical processor performances (PCPs) 7 supporting one or more logical partitions (LPARs) 8 where each logical partition includes one or more logical processors (LCPs) 4.

In the logically partitioned CPC computer system 1, the SAP processor 5 in accordance with the present invention operates to bind one or more of the logical processors (LCPs) 4 exclusively to a like number of physical processor (CPs) 3. With such binding, no other logical processor (LCP) 4 is allowed to be dispatched to any exclusively bound physical processor (CP) 3. By way of example for illustrative purposes only, logical processor (LCP1) 4-1 is exclusively bound to physical processor (CP04) 3-4. The exclusive binding of physical processor (CP04) 3-4 to logical processor (LCP1) 4-1 is under supervision of the SAP processor 5. The logical processor LCP1 is either dispatched or undispatched on the exclusive processor CP04 and no other logical processor (LCP) 4 can be dispatched on the exclusive processor CP04 even if CP04 is otherwise available. The exclusive binding of the logical processor (LCP1) with the physical processor CP04 has the advantage of essentially eliminating all forms of virtualization overhead while retaining the flexibility to meet changing workload demands.

A disadvantage of exclusively binding processors, such as CP04, to logical processors, such as LCP1 of logical partition (LPAR) $8_1$, is one of cost, since the available hardware capacity of CP04 when LCP1 is undispatched is essentially wasted capacity. Since the capacity of CP04 is unavailable, additional other ones of the processors 3 must be provided to meet the overall capacity demands of the CPC system 1. However, this disadvantage is not as great as it might seem, given the trend towards processor commoditization as further accelerated by multi-core technology providing an increasing number of cores per chip. In many cases, the added cost of additional processors 3 is more than compensated for by the savings in software licensing costs by right-sizing the capacity of each logical partition (LPAR) and allowing dynamic load-leveling between LPARs to occur.

Figure 2:
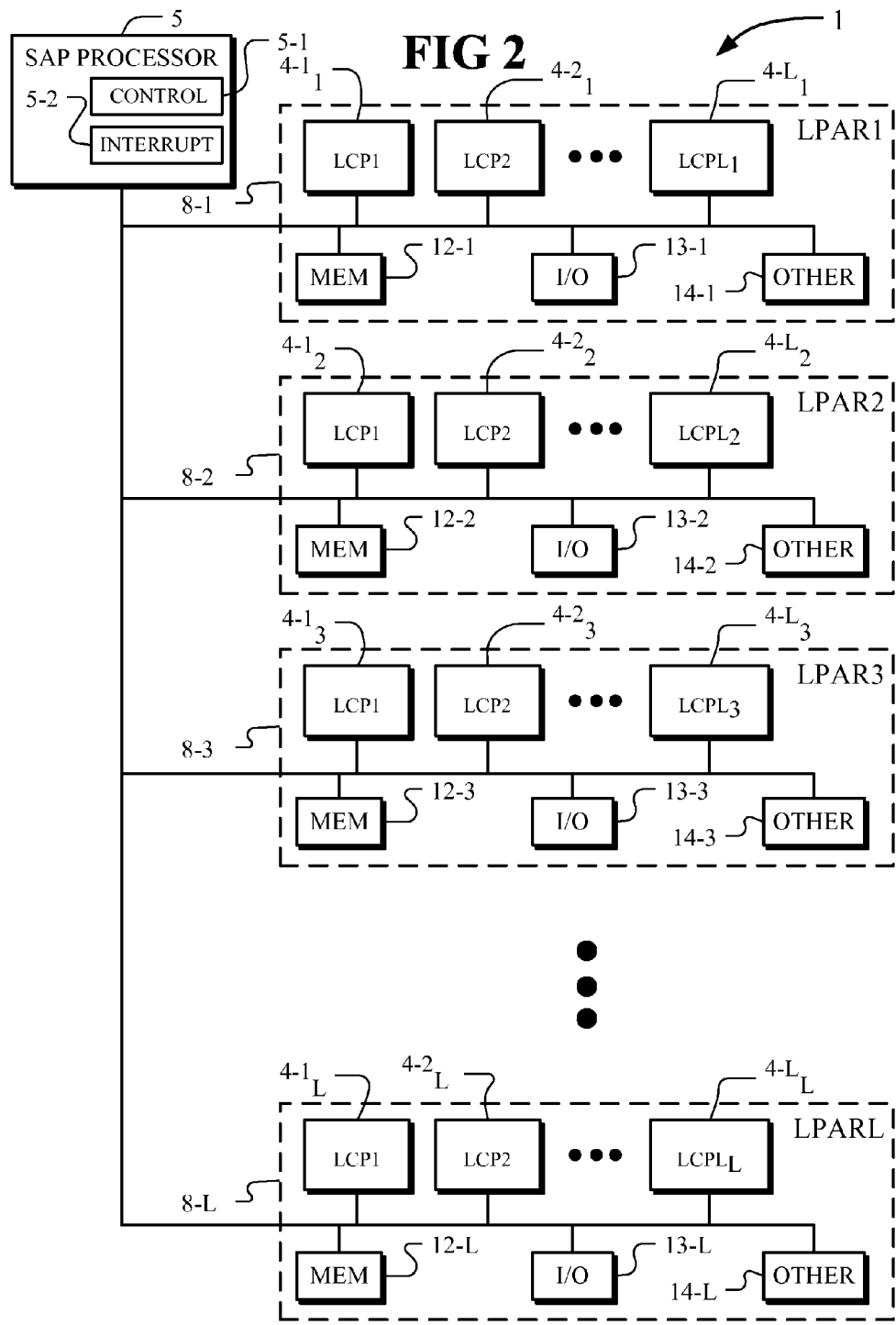
FIG. 2 depicts a block diagram of a configuration of L logical partitions (LPARs) for use in a computer complex of the FIG. 1 type.

In FIG. 2, the L logical partitions (LPARs) 8 including LPARs 8-1, 8-2, . . . , 8-L are of the type useful in the computer system of FIG. 1. Each LPAR 8 includes one or more logical processors (LCPs) 4, memory (MEM) 12, I/O 13 and other facilities 14. The logical processors (LCPs) 4, memory (MEM) 12, I/O 13 and other facilities 14 may be different for each of the partitions 8 as determined, for example, by the system assist processor (SAP) 5. The SAP processor 5 includes data tables and other facilities (generally partition resource maps) that establish the membership and relationships in the partitions 8.

In particular, the logical partition (LPAR1) 8-1 includes the logical processors (LCPs) 4 including logical processors $4\text{-}1_1, 4\text{-}2_1, \ldots, 4\text{-}L_1$, includes the memory 12-1, includes the I/O 13-1 and includes other facilities 14-1. The logical partition (LPAR2) 8-2 includes the logical processors (LCPS) 4 including logical processors $4\text{-}1_2, 4\text{-}2_2, \ldots, 4\text{-}L_2$, includes the memory 12-2, includes the I/O 13-2 and includes other facilities 14-2. The logical partition (LPAR3) 8-3 includes the logical processors (LCPS) 4 including logical processors $4\text{-}1_3, 4\text{-}2_3, \ldots, 4\text{-}L_3$, includes the memory 12-3, includes the I/O 13-3 and includes other facilities 14-3. The logical partition (LPARL) 8-L includes the logical processors (LCPS) 4 including logical processors $4\text{-}1_L, 4\text{-}2_L, \ldots, 4\text{-}L_L$, includes the memory 12-L, includes the I/O 13-L and includes other facilities 14-L.

Figure 3:
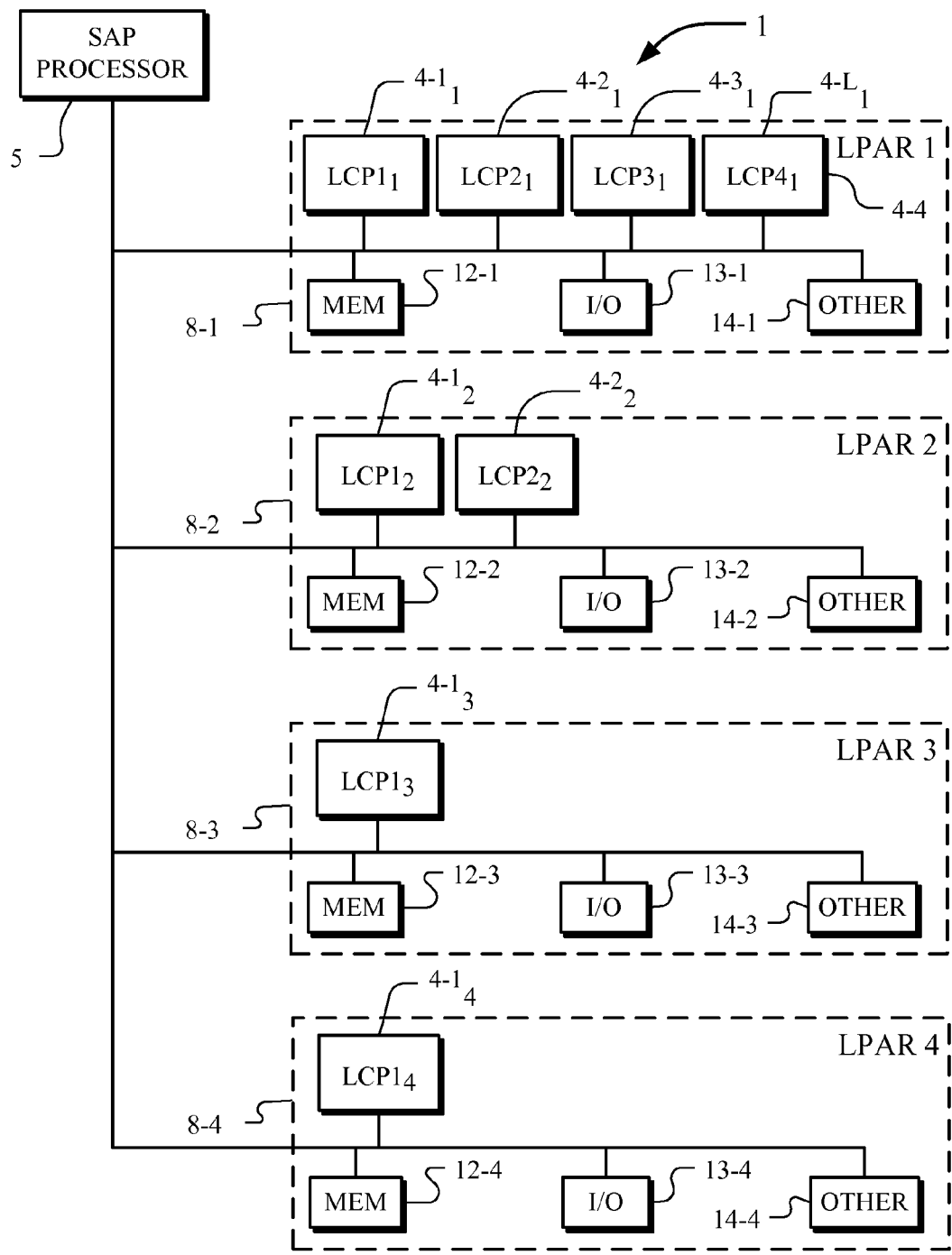
FIG. 3 depicts a block diagram of a configuration of 4 logical partitions (LPARs) for use in a computer complex of the FIG. 1 type.

FIG. 3 depicts a block diagram of one particular embodiment of FIG. 2 including a configuration of four logical partitions (LPARs) 8-1, 8-2, 8-3 and 8-4 for use in a computer complex of the FIG. 1 type. In FIG. 3, the logical partition (LPAR1) 8-1 includes the logical processors (LCPS) 4 including logical processors (LCPS) $4\text{-}1_1, 4\text{-}2_1, 4\text{-}3_1, 4\text{-}4_1$, includes the memory 12-1, includes the I/O 13-1 and includes other facilities 14-1. The logical partition 8-2 (LPAR2) includes the logical processors 4 (LCPs) including logical processors $4\text{-}1_2$ and $4\text{-}2_2$, includes the memory 12-2, includes the I/O 13-2 and includes other facilities 14-2. The logical partition 8-3 (LPAR3) includes the logical processor 4 (LCP) including logical processor $4\text{-}1_3$, includes the memory 12-3, includes the I/O 13-3 and includes other facilities 14-3. The logical partition 8-4 (LPAR4) includes the logical processor $4\text{-}1_4$ (LCP), includes the memory 12-4, includes the I/O 13-4 and includes other facilities 14-4.

In FIG. 4, one embodiment of a partition resource map is shown and the map is used to partition the central processing complex computer system of FIG. 1 with the logical partitions of FIG. 3. The system assist processor (SAP) 5 of FIG. 1 or other control element in the computer system of FIG. 1 uses the partition resource map of FIG. 4 to map physical components in a partitioned environment. Partition resource maps of the FIG. 4 type are used to provide system management and configuration functionality and may be used to map physical components such as processors, memory pages, I/O ports and other facilities among the various partitions by storing a logical and physical partition for each physical resource. Partition resource maps are further used for monitoring the reliability, availability, and serviceability (RAS) of a system's physical resources. In embodiments of the present invention, partition resource maps are used to monitor the characteristics and control the uses of the system's physical resources. Certain physical resources cannot be used because they are reserved for exclusivity or are off-line, unplugged, or otherwise not available.

As indicated in FIG. 4, the logical partition LPAR1 has four logical processors $4\text{-}1_1, 4\text{-}2_1, 4\text{-}3_1$ and $4\text{-}4_1$ (LCP$1_1$, LCP$2_1$, LCP$3_1$ and LCP$4_1$) as shown in FIG. 3. The logical processors LCP$1_1$, LCP$2_1$, LCP$3_1$ and LCP$4_1$ are associated nonexclusively with the four physical processors 3-1, 3-2, 3-3 and 3-4 (CP01, CP02, CP03 and CP04) in FIG. 1.

In FIG. 4, the logical partition LPAR2 has two logical processors $4\text{-}1_2$ and $4\text{-}2_2$ (LCP$1_2$ and LCP$2_2$) as shown in FIG. 3. The logical processors LCP$1_2$ and LCP$2_2$ are associated nonexclusively with the two physical processors 3-2 and 3-4 (CP02 and CP04) in FIG. 1.

In FIG. 4, the logical partition LPAR3 has one logical processor $4-1_3$ ($LCP1_3$) as shown in FIG. 3. The logical processor $LCP1_3$ is associated nonexclusively with the physical processor 3-1 (CP01) in FIG. 1.

In FIG. 4, the logical partition LPAR4 has one logical processor $4-1_4$ ($LCP1_4$) as shown in FIG. 3. The logical processor $LCP1_4$ is associated nonexclusively with the physical processor 3-5 (CP05) in FIG. 1. Although physical processor CP05 is not currently being used with any logical processor other than logical processor $LCP1_4$, the exclusive control is not active to prevent physical processor CP05 from being shared with other logical processors. None of the physical processors CP01, CP02, . . . , CP05 in the partition map of FIG. 4 is designated as being exclusively bound to any particular logical partition (LPAR) or particular logical processor (LCP). The physical processors CP01, CP02, and CP04 are shared among logical partitions LPAR1, LPAR2 and LPAR3. The physical processors CP01, CP02, and CP04 are shared among logical partitions LPAR1, LPAR2 and LPAR3. The physical processors CP02 and CP04 are shared among logical partitions LPAR1 and LPAR2. The physical processors CP01 processes logical partitions LPAR3 and is shared with LPAR1. The physical processors CP05 processes logical partition LPAR4 and is not shared.

In FIG. 4, LPAR1 has its own memory allocation M1, I/O allocation I/O1 and other facilities allocation O1. Similarly, LPAR2, LPAR3 and LPAR4 each has its own memory allocation M2, M3 and M4; I/O allocation I/O2, I/O3 and I/O4; and other facilities allocation O2, O3 and O4, respectively. The manner in which such allocations are made for logical partitions is well known.

In FIG. 5, another embodiment of a partition resource map is shown and the map is used to partition the central processing complex computer system of FIG. 1 with the logical partitions (LPARs) of FIG. 3. The partition resource map of FIG. 5 differs from the partition resource map of FIG. 4 in that in FIG. 5, the physical processors (CPs) are exclusively bound to logical processors (LCPs). Also in FIG. 5 relative to FIG. 4, the number of physical processors is increased from five to eight while the total PCP accumulated physical processor performance (PCP) units may be designated as less than or equal to 8. The physical processor (CP) exclusivity is implemented by dispatching and undispatching the same logical processors (LCPs) for execution on the same physical processor (CP) at regular intervals so as to achieve the desired percentage utilization as measured in whole or fractional physical processor performance (PCP) units.

As indicated in FIG. 5, the logical partition LPAR1 has four logical processors $4-1_1$, $4-2_1$, $4-3_1$ and $4-4_1$ from FIG. 3 ($LCP1_1$, $LCP2_1$, $LCP3_1$ and $LCP4_1$). The logical processors $LCP1_1$, $LCP2_1$, $LCP3_1$ and $LCP4_1$ are associated exclusively with four physical processors 3-2, 3-4, 3-5 and 3-7 {not explicitly shown in FIG. 1} (CP02, CP04, CP05 and CP07) shown or implied in FIG. 1.

In FIG. 5, the logical partition LPAR2 has two logical processors $4-1_2$ and $4-2_2$ from FIG. 3 ($LCP1_2$ and $LCP2_2$). The logical processors $LCP1_2$ and $LCP2_2$ are associated exclusively with the two physical processors 3-3 and 3-6 {not explicitly shown in FIG. 1} (CP03 and CP06) shown or implied in FIG. 1.

In FIG. 5, the logical partition LPAR3 has one logical processor $4-1_3$ ($LCP1_3$) in FIG. 3. The logical processor $LCP1_3$ is associated exclusively with the physical processor 3-1 (CP01) in FIG. 1.

In FIG. 5, the logical partition LPAR4 has one logical processor $4-1_4$ ($LCP1_4$) in FIG. 3. The logical processor $LCP1_4$ is associated exclusively with the physical processor 3-8 {not explicitly shown in FIG. 1} (CP08) implied in FIG. 1.

All of the physical processors CP01, CP02, . . . , CP08 {not all explicitly shown in FIG. 1} in the partition map of FIG. 5 are designated as being exclusively bound to particular logical partitions (LPARs) and particular logical processors (LCPs). None of the physical processors CP01, CP02, . . . , CP08 are shared among any logical partitions (LPARs) or logical processors (LCPs).

In FIG. 5, LPAR1 has its own memory allocation M1, I/O allocation I/O1 and other facilities allocation O1. Similarly, LPAR2, LPAR3 and LPAR4 each has its own memory allocation M2, M3 and M4; I/O allocation I/O2, I/O3 and I/O4; and other facilities allocation O2, O3 and O4, respectively. The manner in which such allocations are made for logical partitions is well known.

Figure 6:
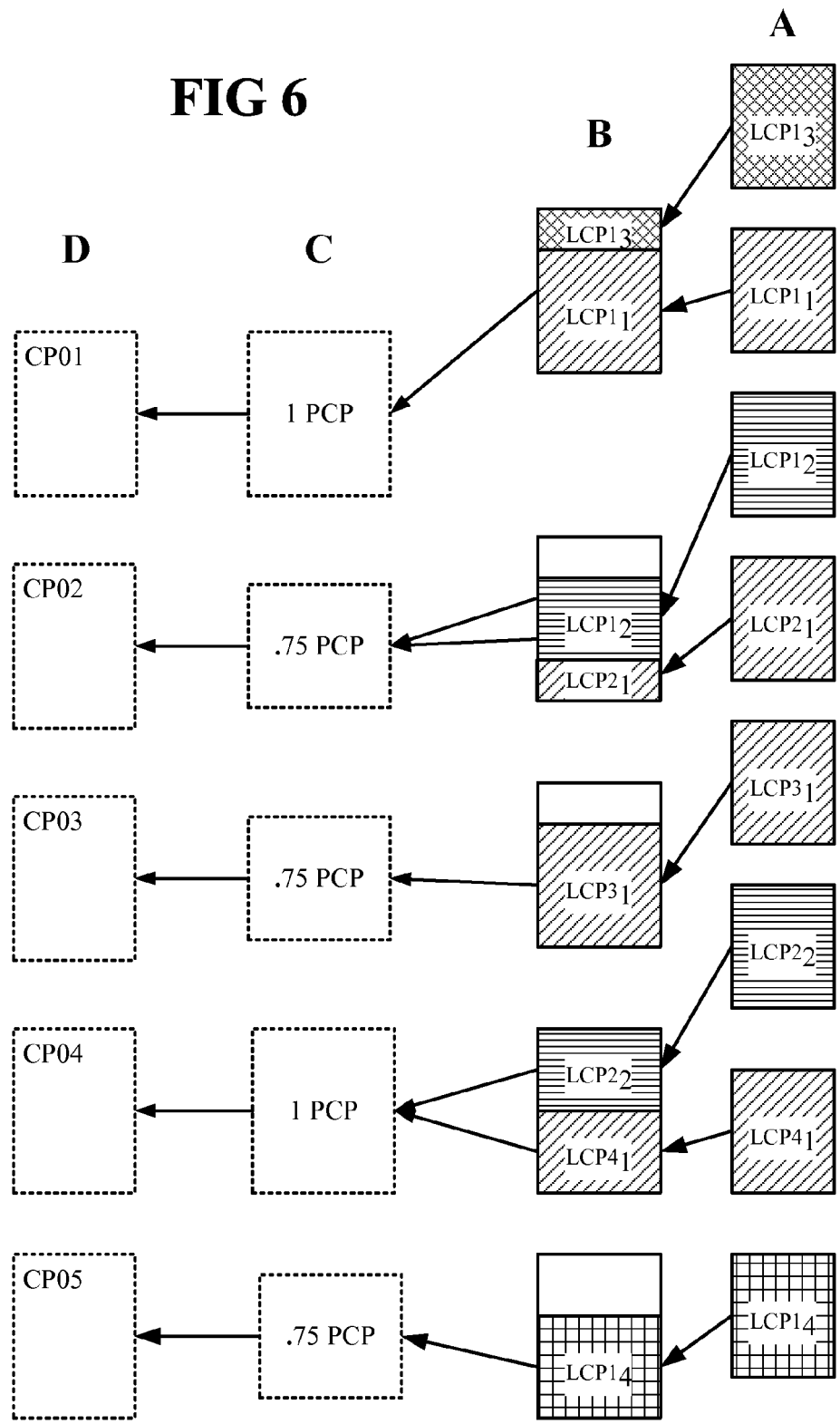
FIG. 6 depicts the partitioning of the central processing complex of FIG. 1 according to the partition resource map of FIG. 4 without exclusive binding.

In FIG. 6, the logical flow for the partitioning of the central processing complex of the computer system 1 of FIG. 1 according to the partition resource map of FIG. 4 is shown. The partitioning does not include any exclusive binding of any of the physical processors CP01, CP02, . . . , CP05. In column A, each of the logical processors (LCP) designated by the partition table of FIG. 4 is shown. The logical processors for logical partition LPAR1 are shown diagonally shaded and are $LCP1_1$, $LCP2_1$, $LCP3_1$ and $LCP4_1$. The logical processors for logical partition LPAR2 are shown horizontally shaded and are $LCP1_2$ and $LCP2_2$. The logical processor for logical partition LPAR3 is shown cross-hatched and is $LCP1_3$. The logical processor for logical partition LPAR4 is shown square-hatched and is $LCP1_4$.

In FIG. 6, column B shows the shared combinations of the logical processors (LCP) of column A with the shaded area being a size indication of the allocation among the logical processors. In particular, $LCP1_3$ is shared with $LCP1_1$ at 0.25 and 0.75 allocations, $LCP1_2$ is shared with $LCP2_1$ at 0.50 and 0.25 allocations, $LCP3_1$ is unshared at 0.75 allocation, $LCP2_2$ is shared with $LCP4_1$ at 0.50 and 0.50 allocations, and $LCP1_4$ is unshared at 0.75 allocation.

In FIG. 6, column C shows the combined physical processor performance (PCP) processing of each of the shared and unshared logical processors with the allocations of column B. In particular, $LCP1_3$ combines with $LCP1_1$ for 1.0 PCP allocation, $LCP1_2$ combines with $LCP2_1$ for 0.75 PCP allocation, $LCP3_1$ is unshared at 0.75 PCP allocation, $LCP2_2$ combines with $LCP4_1$ for 1.0 PCP allocation, and $LCP1_4$ is unshared at 0.75 allocation.

In FIG. 6, column D shows the physical processors (CPs) that perform the physical CPU processing for the accumulated totals as indicated in column C. In particular, the 1.0 PCP processing for the $LCP1_3$ combination with $LCP1_1$ is executed on physical processor CP01; the 0.75 PCP processing for the $LCP1_2$ combination with $LCP2_1$ is executed on physical processor CP02; the 0.75 PCP processing for the $LCP3_1$ is executed on physical processor CP03, the 1.0 PCP processing for the $LCP2_2$ combination with $LCP4_1$ is executed on physical processor CP04; and the 0.75 PCP processing for the $LCP1_4$ is executed on physical processor CP05.

In FIG. 6, the eight logical processors $LCP1_1$, $LCP2_1$, $LCP3_1$ and $LCP4_1$ (from LPAR1), $LCP1_2$ and $LCP2_2$ (from LPAR2), $LCP1_3$ (from LPAR3) and $LCP1_4$ (from LPAR4) execute on the five physical processors CP01, CP02, . . . , CP05.

In FIG. 6, it is evident that the total physical processor performance (PCP) accumulated processing of column C equals 4.25 PCP units of processing and that such processing is accomplished on the five physical CP01, CP02, ..., CP05. In a typical licensing environment where licenses based on maximum potential capacity are granted, a 5-way license is required for the FIG. 6 operation.

Figure 7:
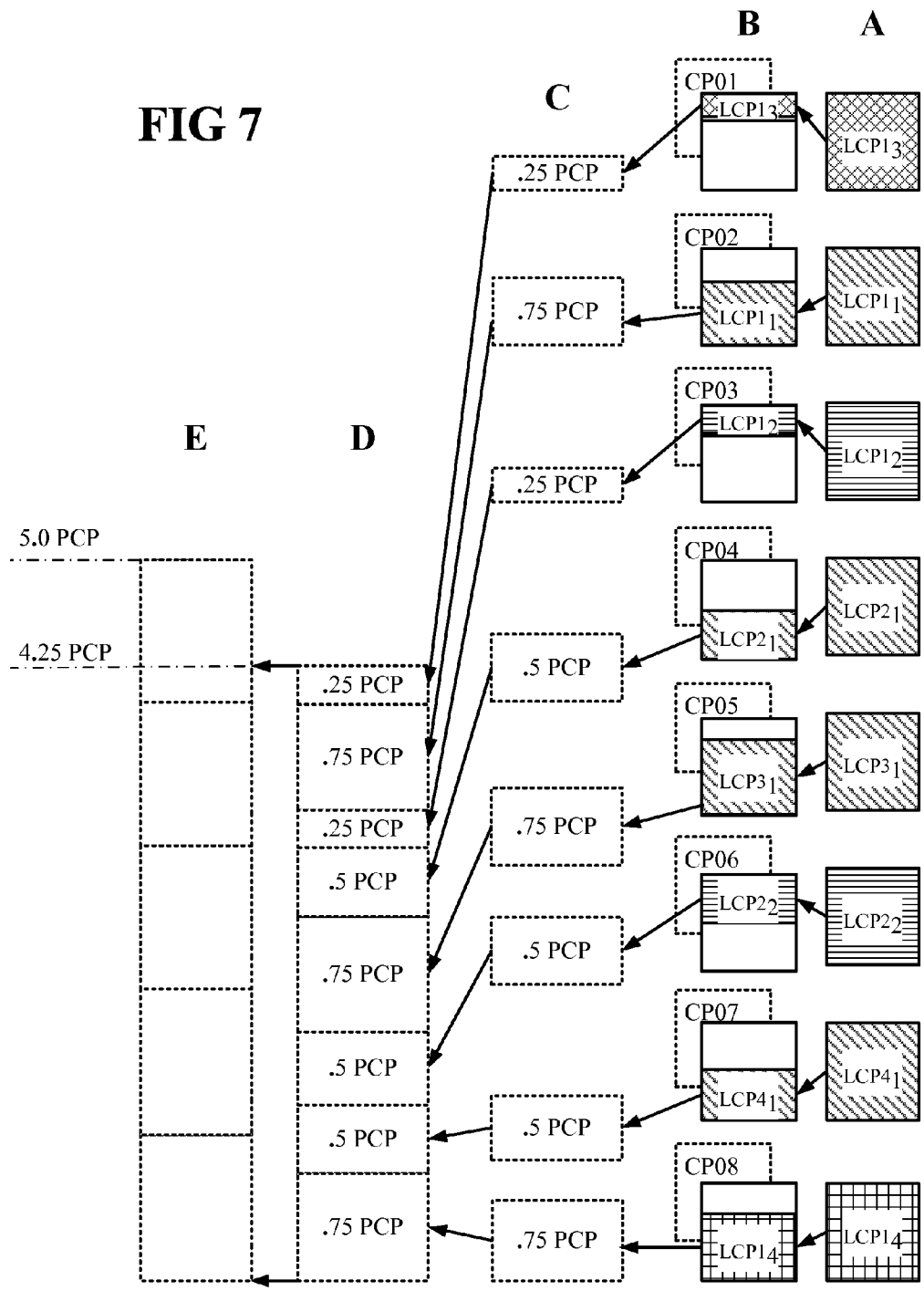
FIG. 7 depicts the Central Processing Complex of FIG. 1 partitioned for processing logical partitions LPAR1, LPAR2, . . . , LPAR4 using physical processors CP01, CP02, . . . , CP08 according to the partition resource map of FIG. 5.

In FIG. 7, the logical flow for the partitioning of the central processing complex of the computer system 1 of FIG. 1 according to the partition resource map of FIG. 5 is shown. The partitioning includes exclusive binding of the physical processors CP01, CP02, ..., CP08. In column A, each of the logical processors (LCPs) designated by the partition resource map of FIG. 5 is shown. The logical processors for logical partition LPAR1 are shown diagonally shaded and are $LCP1_1$, $LCP2_1$, $LCP3_1$ and $LCP4_1$. The logical processors for logical partition LPAR2 are shown horizontally shaded and are $LCP1_2$ and $LCP2_2$. The logical processor for logical partition LPAR3 is shown cross-hatched and is $LCP1_3$. The logical processor for logical partition LPAR4 is shown square-hatched and is $LCP1_4$.

In FIG. 7, column B shows one example of the utilization of logical processors (LCPs) of column A when the logical processors (LPARs) of FIG. 3 and FIG. 7 are set with values in partition resource map of FIG. 5. In the example of FIG. 7, the partition resource map of FIG. 5 sets LPAR1 to 2.5 PCP units, LPAR2 to 0.75 PCP units, LPAR3 to 0.25 PCP units and LPAR4 to 0.75 PCP units for a total of 4.25 PCP units for all logical partitions (LPARs). The utilization (measured in PCP units) for the individual logical processors (LCPs) in each logical partition (LPAR) varies from time to time based, in part, upon the demand level and availability of each logical processor (LCP) in the logical partition (LPAR). In FIG. 7, column B is an example of the logical processor (LCP) utilization. The shaded areas in the LCPs of column B are a size indication of the instantaneous utilization of the logical processors (LCPs). In particular, $LCP1_3$ has a 0.25 utilization on physical processor CP01. $LCP1_1$ has a 0.75 utilization on physical processor CP02. $LCP1_2$ has a 0.25 utilization on physical processor CP03. $LCP2_1$ has a 0.50 utilization on physical processor CP04. $LCP3_1$ has a 0.75 utilization on physical processor CP05. $LCP2_2$ has a 0.50 utilization on physical processor CP06. $LCP4_1$ has a 0.50 utilization on physical processor CP07. $LCP1_4$ has a 0.75 utilization on physical processor CP08.

In FIG. 7, column C shows the physical processor performance (PCP) processing of each of the unshared logical processors of column B. In FIG. 7, column D shows the combined physical processor performance (PCP) processing for all eight of the logical processors (LCPs). Specifically, in FIG. 7, the eight logical processors $LCP1_1$, $LCP2_1$, $LCP3_1$ and $LCP4_1$ (from LPAR1), $LCP1_2$ and $LCP2_2$ (from LPAR2), $LCP1_3$ (from LPAR3) and $LCP1_4$ (from LPAR4) execute in an exclusive relationship on the eight physical processors CP01, CP02, ..., CP08.

In FIG. 7, it is evident that the total PCP accumulated physical processor performance of column D equals 4.25 PCP units and that such processing is accomplished, when rounded up to the next whole PCP unit, with five physical processor performance (PCP) units or less. In a typical licensing environment where licenses based on maximum potential capacity are granted, a "4.25-way" license is required for the FIG. 7 operation, notwithstanding that eight physical processors CP01, CP02, ..., CP08 are employed. Because there is no one-to-one correspondence between physical processors (CPs) and licensable physical processor performances (PCPs) as in FIG. 6, the maximum potential capacity need not be an integral number of PCPs, but rather is explicitly limited by the exclusive controls, as described in further detail below. The system is nominally still considered a "5-way" license but its capacity is limited to 4.25 equivalent PCPs. Side-effects of non-integral PCP capacity in this case include the fact that total PCP utilization cannot exceed 4.25/5=85% of the nominal capacity, and that the maximum number of dedicated logical processors (LCPs) is 4 rather than 5. Of course, PCP capacity can be defined to be an integer for other embodiments of the CPC computer system 1 of the FIG. 1 type, in which case these side-effects would not be present. However, the licensing advantages of right-sizing the CPC computer system to exactly the required capacity normally more than compensates for these minor side-effects.

In operation of the CPC computer system 1 of FIG. 1 in various different modes, the SAP processor 5 and control element 5-1 reference the partition resource map currently in control, for example, the partition resource maps of FIG. 4 and FIG. 5. For purposes of explanation, it is assumed that there are four logical partitions 8 (LPARs) as shown in FIG. 3 as specified by the partition resource maps of FIG. 4 and FIG. 5. Each of the partition resource maps of FIG. 4 and FIG. 5 has controls CTL1, CTL2, CTL3 and CTL4 for the logical partitions LPAR1, LPAR2, LPAR3 and LPAR4 of FIG. 5. These controls are used to assist in the implementation of processor exclusivity operation. In substance, the SAP processor 5 assigns each logical partition (LPAR) logical partition utilization values, such as minimum utilization and target utilization, and the LPAR reports back the actual logical partition utilization. The dispatching and undispatching of the logical processors (LCPs) on the same physical processors (CPs) is done at regular intervals so as to achieve the desired percentage utilization as measured in PCP units.

The control fields for controlling the physical processor performance (PCP) processing allocated to each of the logical partitions (LPARs) and as used by each of the logical processors (LCPs) in a logical partition (LPAR) are based on the following TABLE 1.

TABLE 1

| | |
|---|---|
| LPAR_EXCL_CPU_ITC_INIT | ITC (interval time counter) value at start of sharing interval |
| LPAR_EXCL_CPU_DISP_CYC | ITC cycles of dispatch time for all LCPs in LPAR |
| LPAR_EXCL_CPU_MIN_FRAC | Ratio of minimum dispatch time to total time |
| LPAR_EXCL_CPU_TGT_FRAC | Ratio of target dispatch time to total time |
| EXCL_CPU_LP_COUNT | Number of shared LCPs in LPAR (0 = dedicated) |
| EXCL_CPU_DISP_CYC | ITC cycles of dispatch time for this LCP |
| EFFECTIVE_CPU_COUNT | Licensed number of PCPs (need not be whole number) |

Figure 8:
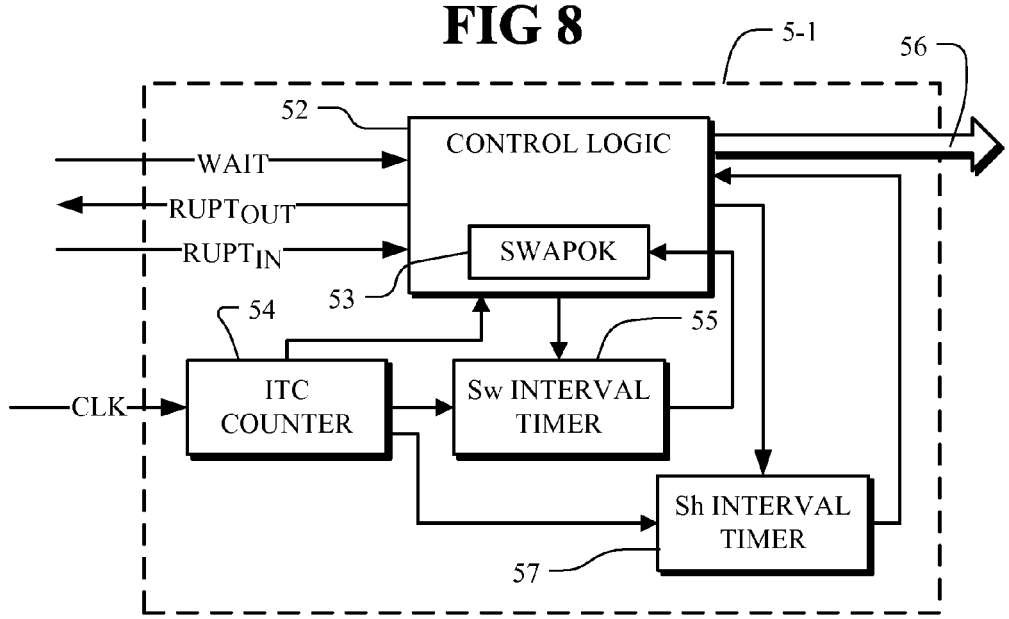
FIG. 8 depicts a block diagram representation of the control element within the SAP processor of FIG. 1 for timing the partitioned resources of the of the central processing complex computer system of FIG. 1.

In FIG. 8, the TABLE 1 operations are under control of control element 5-1 of FIG. 1. An interval time counter (ITC) 54 is incremented by the system clock signal (CLK) which provides an input to the swap interval timer 55 and the sharing interval timer 57. The swap interval timer 55 starts and stops swap intervals (SwI) under control of control logic 52 which includes a swap (SWAPOK) flag 53. Typically, the durations of the swap intervals (SwI) are of the order of a number of milliseconds. The sharing interval timer 57 starts and stops sharing intervals (ShI) under control of control logic 52. Typically, the durations of the sharing intervals (ShI) are of the order of a number of seconds, several orders of magnitude longer than the duration of the swap intervals (SwI). Control 52 receives the system interrupt signal, $RUPT_{IN}$, to the control element 5-2 and provides outputs 56 for controlling the dispatching and undispatching of logical processors (LCPs). Control element 52 provides an interrupt signal, $RUPT_{OUT}$, for signaling an interrupt to the interrupt facility 5-2 of the SAP processor 5 and to the computer system 1. The interrupt signal, $RUPT_{OUT}$, signals the commencement of the virtualization processing of FIG. 10 to control the dispatching and undispatching of a logical processors (LCP). Control 52 receives the WAIT signal input that signals when a logical processor is in a WAIT state. The control logic 52 initiates swap intervals (SwI) through swap interval timer 55. A sequence of consecutive swap intervals (SwI) comprises a sharing interval (ShI). The control logic 52 stores the initial ITC count (INIT value) of counter 54 at the beginning of each sharing interval (ShI) and sub-tracts the INIT value from the current ITC count at the end of each successive swap interval. These counts are accumulated and processed to obtain the fractional utilization of the different logical processors (LCPs).

Figure 9:
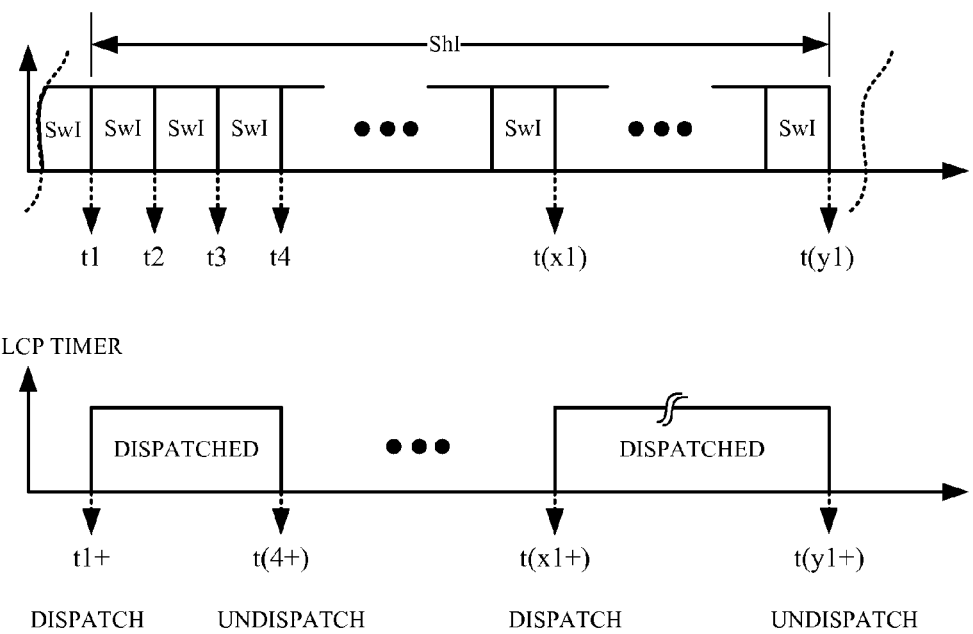
FIG. 9 depicts the dispatching and undispatching of a logical processor (LCP) during swap intervals (SwI) over a sharing interval (ShI).

In FIG. 9, a typical example includes a consecutive sequence of swap intervals (SwI), having a duration set by the control element 5-1 of FIG. 8, comprising a single sharing interval (ShI). The swap intervals end at times t1, t2, t3, t4, . . . , t(x1), . . . , t(y1). In FIG. 9, as one example, one LCP is dispatched at t(1+) and is undispatched at t(4+) and again is dispatched at t(x1+) and is undispatched at t(y1+). The control element 5-1 of FIG. 8 includes data and logic useful in executing the time accounting among logical processors.

In TABLE 1, the first four variables are LPAR-specific. Although the LP_COUNT can be implemented at the LPAR level, a separate copy per logical processor (LCP) is provided as a convenient means of indicating which logical processors are dedicated. Further details of the processing protocol are provided in the following TABLE 2:

LCP exclusivity consists of controlled dispatch processing where the dispatching and undispatching of the same logical processor LCP occurs on the same physical processor (CP) at regular swap intervals so as to achieve the desired percentage utilization within each successive sharing interval. During this controlled dispatch processing, the swap flag "SWAPOK" is set each time the swap interval ends and is reset when the logical processor LCP swap processing has been initiated for the next swap interval. The processing of the time-sharing dispatch/undispatch (swap) code occurs during normal system interrupts (RUPTs) of the FIG. 1 computer system. There is also code for Load Processor Status Word (LPSW) to undispatch logical processors LCPs when PSW WAIT states are being entered. The dispatch code (for dispatch/undispatch operations) is processed for system RUPTs and typically includes processing for system I/O RUPTs thereby allowing logical processors (LCPs) which are undispatched due to I/O WAITs to be re-dispatched in a timely fashion when appropriate.

In one embodiment, a controlled dispatch virtualization implementation for exclusivity employs several local variables for each logical partition (LPAR) as set forth in the following TABLE 3:

TABLE 3

EXCL_CPU_DISP_ITC_INIT //ITC value at start of dispatch interval or last update of EXCL_CPU_DISP_CYC during a dispatch interval
dispmin=(ITC-LPAR_EXCL_CPU_ITC_INIT)*
   EXCL_CPU_LP_COUNT*LPAR_EXCL_CPU_MIN_FRAC
disptgt=(ITC-LPAR_EXCL_CPU_ITC_INIT)*
   EXCL_CPU_LP_COUNT*LPAR_EXCL_CPU_TGT_FRAC
dispcyc = LPAR_EXCL_CPU_DISP_CYC In TABLE 3, EXCL_CPU_DISP_ITC_INIT is the initial (INIT) value for a logical processor's (LCP's) count and this value is reinitialized for each dispatch interval or last update of EXCL_CPU_DISP_CYC during the dispatch interval, and is cleared at the end of the dispatch interval. In TABLE 3, dispmin is the minimum dispatch time for all the logical processors (LCPs) in the logical partition (LPAR), In calcu-

TABLE 2

1. The SAP processor 5 specifies the number of shared processors in the EXCL_CPU_LP_COUNT field of each shared processor. Dedicated processors are indicated by setting the EXCL_CPU_LP_COUNT to 0.
The EXCL_CPU_LP_COUNT can be changed dynamically as needed.
2. Based on user input and/or system workload demands, the SAP specifies the target and minimum percentage utilization for each logical partition (LPAR), expressed as floating point fractions in LPAR_EXCL_CPU_TGT_FRAC and LPAR_EXCL_CPU_MIN_FRAC.
3. The SAP initiates the sharing interval by filling in the start time in LPAR_EXCL_CPU_ITC_INIT with the adjusted ITC and clearing the accumulated dispatch time in LPAR_EXCL_CPU_DISP_CYC, preferably in that order. This step needs to be accomplished in real time without undue delay for best timing accuracy.
4. The duration of the sharing interval may be chosen by the SAP, but somewhere in the range of 1-10 seconds is typically reasonable. At the end of each sharing interval, the SAP reads LPAR_EXCL_CPU_DISP_CYC for each LPAR, setting a new LPAR_EXCL_CPU_ITC_INIT and clearing LPAR_EXCL_CPU_DISP_CYC immediately thereafter to initiate the next sharing interval. By dividing LPAR_EXCL_CPU_DISP_CYC by the product of EXCL_CPU_LP_COUNT and the total ITC cycle count for the interval, the percentage utilization (LPAR_Util) of the LPAR for the sharing interval is obtained
5. Based upon the actual utilizations (LPAR_Util) thus obtained, the SAP then adjusts LPAR_EXCL_CPU_TGT_FRAC and/or LPAR_EXCL_CPU_MIN_FRAC up or down as appropriate to achieve optimum system efficiency within whatever constraints may have been specified by the user.
6. The sum of the LCP utilizations across all LPARs is the actual system utilization and this value must not exceed the total system utilization, EFFECTIVE_CPU_COUNT, set by the SAP processor 5-1. The total system utilization is typically the total licensed capacity of the system. It is rounded up to obtain the nominal number of physical processors in the system.

lating dispmin, the sharing interval (ITC-LPAR_EX-CL_CPU_ITC_INIT) is multiplied by the number (EX-CL_CPU_LP_COUNT) of LCPs in the LPAR to obtain the maximum potential dispatch time for the LPAR as a whole. The maximum potential dispatch time is then multiplied by the minimum fraction, LPAR_EXCL_CPU_MIN_FRAC to obtain dispmin. In TABLE 3, disptgt is the target dispatch time for all the logical processors (LCPs) in the logical partition (LPAR). The maximum potential dispatch time is multiplied by the target fraction, LPAR_EXCL_CPU_TGT_FRAC, to obtain disptgt. In TABLE 3, dispcyc is the actual dispatch time, LPAR_EXCL_CPU_DISP_CYC, for all the logical processors (LCPs) in the logical partition (LPAR). Separate values of dispmin, disptgt and dispcyc are determined for each logical processor (LCP) at each swap interval.

Figure 10:
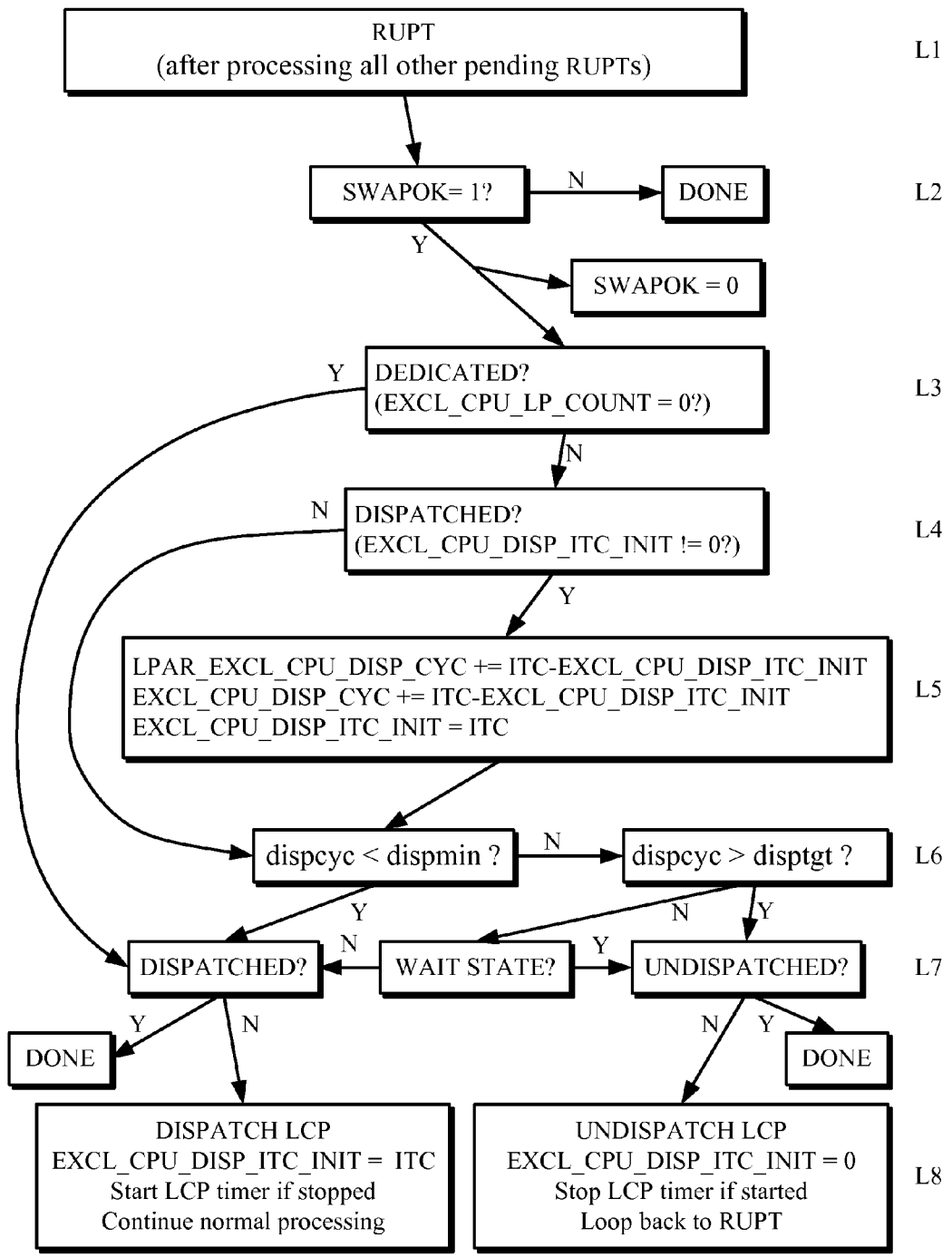
FIG. 10 depicts the virtualization processing in the FIG. 7 computer system executed for each logical processor (LCP) during non-WAIT states.

In FIG. 10, the time-sharing dispatching (dispatching and /undispatching) of the virtualization processing for each logical processor (LCP) is shown. At the end of each swap interval (SwI), as shown in FIG. 9, the SWAPOK flag is set, SWAPOK=1. The setting of the SWAPOK flag initiates RUPT processing with the $RUPT_{OUT}$ signal but other system interrupts, $RUPT_{IN}$, may initiate RUPT processing as well. System interrupts include, for example, CPU timer, TOD clock comparator, I/O interrupts, and so forth. After all other system interrupts have been processed by the computer system of FIG. 1, the $RUPT_{OUT}$ interrupt and the FIG. 10 flow of level L1 commences. In level L2, the state of the SWAPOK swap flag is tested with the test SWAPOK=1?. During processing, the SWAPOK flag is used to ensure that at least one interval has elapsed since the last dispatch/undispatch of the logical processor (LCP). In level L2, if the SWAPOK flag test results in a no (N), then the FIG. 10 processing is DONE. If the SWAPOK=1? test results in a yes (Y), then the SWAPOK flag is reset with SWAPOK=0 and the FIG. 10 virtualization continues to level L3.

In level L3, a test DEDICATED? is made to determine if the LCP is dedicated, a condition which exists if and only if EXCL_CPU_LP_COUNT=0. If the results of the dedicated test are yes (Y), the processing advances to level L7 and a test DISPATCHED? is made to determine if the LCP is dispatched, a condition which exists if and only if EXCL_CPU_DISP_ITC_INIT !=0. If the results of the dispatch test in level L7 is yes (Y), the processing is DONE until the next swap interval. If the results of the dispatch test in level L7 is no (N) in level L8, the LCP is dispatched. In level L8, the initial value at the start of a dispatch interval is set EXCL_CPU_DISP_ITC_INIT=ITC, the LCP timer is started if stopped and normal processing continues.

In level L3, if the test DEDICATED? determines that the LCP is not dedicated and the test result is no (N), in level L4 a test DISPATCHED? is made to determine if the LCP is dispatched and if the result is yes (Y), updating occurs in level L5. In level L5, the DISP_CYCs are updated and the ITC value as of said update is indicated in TABLE 4 as follows:

TABLE 4

1 LPAR_EXCL_CPU_DISP_CYC +=
  ITC-EXCL_CPU_DISP_ITC_INIT
2 EXCL_CPU_DISP_CYC += ITC-EXCL_CPU_DISP_ITC_INIT
3 EXCL_CPU_DISP_ITC_INIT = ITC

In level L4, if the logical processor (LCP) has not been dispatched, the result of the test DISPATCHED? is N, the updating of TABLE 4 is bypassed and the utilization analysis of level L6 is performed. In either case, with or without the updating of TABLE 4, the utilization analysis of level L6 proceeds. A test dispcyc<dispmin? is made to determine if the logical partition utilization, dispcyc, is below the minimum dispmin. If below the minimum, the result of the test is yes (Y) and in level L7 a test DISPATCHED? is made to determine if the LCP is dispatched and if the result of the test is yes (Y), the processing is DONE for FIG. 10. If the result of the test DISPATCHED? results in a no (N), the LCP is dispatched in level L8. In level L8, the initial value at the start of a dispatch interval is set EXCL_CPU_DISP_ITC_INIT=ITC, the LCP timer is started if stopped and normal processing continues.

In level L6, if the utilization analysis test, to determine if the logical partition utilization is not below the minimum (dispcyc<dispmin?), result in a no (N), a test dispcyc>disptgt? is made to determine if the logical partition utilization is above the target. If the result is yes (Y) in level L6, then the test UNDISPATCHED? is made in level L7 to determine if the LCP is undispatched. If the result is yes (Y), the processing is DONE. If the result is no (N) in level L8, the dispatch interval is ended by clearing EXCL_CPU_DISP_ITC_INIT, the LCP timer if stopped is started and the processing loops back to RUPT.

In level L6, if the utilization analysis determines that logical partition utilization, dispcyc, is between the minimum dispmin and the target disptgt, then a test WAIT STATE? is made in level L7 to determine if the processing is in a WAIT state. If the results of the test are yes (Y), the test UNDISPATCHED? is made in level L7 to see if the LCP is undispatched. If the result is yes (Y), the processing is DONE. If the result is no (N), the dispatch interval is ended by clearing EXCL_CPU_DISP_ITC_INIT, the LCP timer if stopped is started and the processing loops back to RUPT.

In level L7, if the result of the WAIT state test is a no (N), a test DISPATCHED? is made to determine if the LCP is dispatched and if the result is yes (Y), the processing is DONE. If the result of the test DISPATCHED? is a no (N), the LCP is dispatched in level L8. In level L8, the initial value at the start of a dispatch interval is set EXCL_CPU_DISP_ITC_INIT=ITC, the LCP timer is started if stopped and normal processing continues.

An example of the operation of the FIG. 10 virtualized processing is given with respect to FIG. 3 under the condition where only LPAR2 and LPAR3 are present. The other LPARs, LPAR1 and LPAR4 in FIG. 3 are inactive or not present for purposes of the example. LPAR2 and LPAR3 have exclusive LCPs, namely, $LCP1_2$, $LCP2_2$ and $LCP1_3$ with each having less than 100% of the capacity of the underlying exclusive CPs. It is assumed with reference to FIG. 7 that the exclusive CPs for the logical processors $LCP1_2$, $LCP2_2$ and $LCP1_3$ are CP03, CP06 and CP01, respectively. Under exclusivity operation, no other LCP can utilize those CPs even if they are otherwise available.

The LPAR2 and LPAR3 example of the operation of FIG. 10 commences with reference to FIG. 8. The CLK signal clocks the increment time counter (ITC) 54. The control logic 52 controls the swap interval timer (SIT) 55 which times the durations of the swap intervals (SI), which is typically on the order of milliseconds. The durations of the sharing intervals can be any value set by the SAP processor 5 of FIG. 1. Typically, the sharing interval is on the order of seconds. For each swap interval, the number of cycles of dispatch time for each logical processor LCP is determined as the difference between the initial ITC count, EXCL_CPU_DISP_ITC_INIT, if it is non-zero, indicating that the LCP was dispatched, and the current count, ITC, in counter 54. Also, at the end of each swap interval, timer 55 of FIG. 8 sets the SWAPOK flag 53, (SWAPOK=1). The SWAPOK flag 53 with an output signal (1 or 0) controls the dispatch timing relative to the swap interval to insure that at least one swap interval has elapsed since the last dispatch/undispatch. The sharing interval exists for the purpose of measuring percentage utilization (that is, the amount of time logical processors are dispatched and undispatched over successive swap intervals).

The SAP processor 5 in executing the virtualization processing of FIG. 10 for each logical processor (LCP) limits the overall system actual utilization by specifying the target percent of time dispatched (TGT_FRAC) for each logical partition (LPAR) and thus the collective average utilization of all logical processors (LCPs) in each logical partition (LPAR). In the particular example described, LPAR2 with the two logical processors (LCPs), $LCP1_2$ and $LCP2_2$, has allocated 40% weight, and LPAR3 with one logical processor ($LCP1_3$) has allocated 60% weight. For purposes of explanation, it is assumed that the total system utilization is 1.5 PCPs, established, for example, as a result of a licensed limit on total system utilization. These values are stored, for example, in the exclusive control fields (CTL) of the partition resource map of FIG. 5 under control of the SAP processor 5. For these values, the SAP processor 5 allocates LPAR2 a target fraction of 1.5*40%/2=30% and allocates LPAR3 a target fraction of 1.5*60%/1=90%. Therefore, LPAR2 consumes at most 2*30%=0.6 PCPs and LPAR3 consumes at most 1*90%=0.9 PCPs, for a total of 0.6+0.9=1.5 PCPs of licensed capacity. In the example described, the 30% for LPAR2 is not necessarily equally divided between the two LCPs ($LCP1_2$ and $LCP2_2$). In particular, as one example, $LCP1_2$ may consume 10% and $LCP2_2$ may consume 20%. These utilization percentages for $LCP1_2$ and $LCP2_2$ can vary from one sharing interval to the next based upon processing demand, but the sum for $LCP1_2$ and $LCP2_2$ never exceeds 30% in the particular example described.

At t1 with the above values, the operation of FIG. 10 proceeds for each of the LCPs of the example, $LCP1_2$, $LCP2_2$ and $LCP1_3$. Assuming that the end of a swap interval of FIG. 9 has occurred at t1 and therefore that the SWAPOK flag 53 is set, SWAPOK=1. To begin the processing at t1 for $LCP1_2$, it is assumed that all pending system interrupts (RUPTs) are processed at level L1. At level L2, the SWAPOK flag is tested and since SWAPOK=1, the result of the test is yes (Y). The result yes (Y), causes the SWAPOK flag 53 to be reset, SWAPOK=0, as virtualized processing proceeds to level L3. At level L3, the DEDICATED? test results in no (N) because $LCP1_2$ has a value of 2 for EXCL_CPU_LP_COUNT. At level L4 in the example, it is assumed that $LCP1_2$ has not been dispatched and the test DISPATCHED? results in a no (N) and level L5 is bypassed to level L6. At level L6, it is assumed that the utilization, dispcyc, is less than a minimum, dispmin, and the test dispcyc<dispmin? results in a no (N). At level L7 it is assumed that $LCP1_2$ has not been dispatched and therefore the test DISPATCHED? results in a no (N). In level L8, the LCP timer for $LCP1_2$ is assumed stopped and is therefore started, with the INIT value, EXCL_CPU_DISP_ITC_INIT, set equal to the ITC count thereby starting the dispatch interval for $LCP1_2$. $LCP1_2$ is dispatched to CP03 at t1+ of FIG. 9.

In the example described, assume the next interrupt is due to a system interrupt condition (not the setting of the SWAPOK flag) and that the system interrupt occurs before t2 in FIG. 9. The FIG. 10 processing for $LCP1_2$, as the result of the system interrupt begins at level L1. At level L2, the SWAPOK flag is tested and found that SWAPOK=0 so that the SWAPOK=1? test results in a no (N) and the FIG. 10 processing is DONE. Any further interrupt processing, due other than to setting of the SWAPOK flag, repeats this loop until the SWAPOK flag is set to 1, which in the example described occurs at t2, at the end of the next swap interval (SwI).

At t2, the end of a swap interval of FIG. 9 has occurred and therefore the SWAPOK flag 53 is set, SWAPOK=1. The setting of the SWAPOK flag 53 causes a swap interrupt at t2. At t2 in FIG. 9, the FIG. 10 processing for $LCP1_2$, begins again after all pending system interrupts (RUPTs) are processed at level L1. At level L2, the SWAPOK=1? test has a value yes (Y). The result yes (Y), causes the SWAPOK flag 53 to be reset, SWAPOK=0, as virtualized processing proceeds to level L3. At level L3, the DEDICATED? test again results in a no (N). At level L4 since $LCP1_2$ has been dispatched, the test results in a yes (Y). At level L5, an update of values occurs as in TABLE 4 above.

In the first update of TABLE 4, the current component of dispatched time for LCP $1_2$,
ITC-EXCL_CPU_DISP_ITC_INIT,
is added to the total dispatched time for all logical processors (LCPs) of LPAR2,
LPAR_EXCL_CPU_DISP_CYC.

In the second update of TABLE 4, the current component of dispatched time for LCP $1_2$,
ITC-EXCL_CPU_DISP_ITC_INIT,
is added to the total dispatched time of $LCP1_2$,
EXCL_CPU_DISP_CYC.

In the third update of TABLE 4, the initial value of the count for $LCP1_2$ for the next count interval,
EXCL_CPU_DISP_ITC_INIT,
is set equal to the current interval time count, ITC, the value in the counter 54 of FIG. 8.

At level L6, it is assumed that utilization of logical processor $LCP1_2$, dispcyc, is less than the minimum, dispmin, and therefore the test dispcyc<dispmin? has a result of yes (Y). At level L7 it is found that $LCP1_2$ has been dispatched and therefore the result of the test DISPATCHED? is yes (Y) and the FIG. 10 processing is done.

At t3, the end of a swap interval of FIG. 9 has occurred and therefore the SWAPOK flag 53 is set, SWAPOK=1. The setting of the SWAPOK flag 53 causes a swap interrupt at t3. In the example being described for $LCP1_2$, the FIG. 10 processing begins again after all pending system interrupts (RUPTs) are processed at level L1. At level L2, the test SWAPOK=1? results in a yes (Y). The result yes (Y) causes the SWAPOK flag 53 to be reset, SWAPOK=0, as virtualized processing proceeds to level L3. At level L3, the DEDICATED? test again results in a no (N). At level L4, since $LCP1_2$ has been dispatched, the test DISPATCHED? results in a yes (Y). At level L5, an update of values of TABLE 4 occurs.

At level L6, in the example described, it is assumed that utilization of logical processor $LCP1_2$, dispcyc, is greater than the minimum, dispmin, and therefore the test dispcyc<dispmin? has a result of no (N). In level L6, it is assumed that utilization of logical processor $LCP1_2$, dispcyc, is less than the target, disptgt, and therefore the test dispcyc>disptgt? has a result of no (N).

In level 7, it is assumed that a WAIT state is not present so the result of the WAIT STATE? test is a no (N). In level L7, the result of the test DISPATCHED? is a yes (Y) and therefore the processing is DONE.

At t4, the end of a swap interval of FIG. 9 has occurred and therefore the SWAPOK flag 53 is set, SWAPOK=1. The setting of the SWAPOK flag 53 causes a swap interrupt at t4. In the example being described for the FIG. 10 processing for $LCP1_2$, the processing begins again after all pending system interrupts (RUPTs) are processed at level L1. At level L2, the SWAPOK=1? test still results in a yes (Y). The result yes (Y), causes the SWAPOK flag 53 to be reset, SWAPOK=0, as virtualized processing proceeds to level L3. At level L3, the DEDICATED? test again results in a no (N). At level L4, LCP1$_2$ has been dispatched and the test DISPATCHED? results in a yes (Y). At level L5, an update of values of TABLE 4 occurs.

At level L6, it is assumed that dispcyc is greater than dispmin and the test dispcyc<dispmin? result is a no (N). At level L6, it is assumed that utilization of logical processor LCP1$_2$, dispcyc, is greater than the target value, disptgt, and therefore the test dispcyc>disptgt? has a result of yes (Y). In level L7, the test UNDISPATCHED? result is a no (N). In level L8, the LCP is undispatched, the value of the LCP INIT value is reset at the start of a dispatch interval, EXCL_CPU_DISP_ITC_INIT=0, the LCP timer is stopped if started and the processing of FIG. 10 loops back to RUPT while in the undispatched state. As indicated in FIG. 9, LCP1$_2$ becomes undispatched at t(4+).

At t(x1), the end of a swap interval of FIG. 9 has occurred and therefore the SWAPOK flag 53 is set, SWAPOK=1. The setting of the SWAPOK flag 53 causes a swap interrupt at t(x1). The processing of FIG. 10 continues with logical processor LCP1$_2$ dispatched at t(x1+), and then is undispatched at t(y1+). The dispatch and undispatch times are controlled as a function of utilization of logical partition LPAR2, dispcyc, relative to the minimum value, dispmin, of logical partition LPAR2 and the target value, disptgt, of logical partition LPAR2. These values are calculated based upon the utilization of all logical processors in LPAR2, which in the present example, includes LCP1$_2$ and LCP2$_2$.

The FIG. 10 processing for LCP2$_2$ proceeds in the same manner as previously described for LCP1$_2$ based upon the minimum value, dispmin, and the target value, disptgt, for logical partition LPAR2. The calculations for LCP1$_2$ and LCP2$_2$ are dependent because they each depend on the total logical processor (LCP) usage for all logical processors of LPAR2.

In FIG. 10, the utilization tests dispcyc<dispmin? and dispcyc>disptgt? are determined on a logical partition (LPAR) basis and therefore the utilization of each of the logical processors (LCPs) in the logical partition (LPAR) are not predetermined. The logical processors (LCPs) are served basically on a first-come/first-served basis. With this operation, if a program running on one logical processor (LCP) goes into a WAIT, then another logical processor (LCP) of the same logical partition (LPAR) having a demand for processing can beneficially utilize that WAIT time to accomplish useful work, up to the available "budget" as determined by the target value, disptgt, for the whole LPAR. The dispatching of logical processors (LCPs) is demand-driven as a function of the demands for processing from each logical processor.

In FIG. 10, the total usage LPAR_EXCL_CPU_DISP_CYC (Util-Tot) for all logical processors of LPAR2 is accumulated according to row 1 of TABLE 4 during the virtualized processing.

The utilization of logical processor LCP1$_2$, EXCL_CPU_DISP_CYC (LCPdispcyc1), is accumulated according to row 2 of TABLE 4 for the LCP1$_2$ iterations of FIG. 10 virtualized processing. The utilization of logical processor LCP2$_2$, EXCL_CPU_DISP_CYC (LCPdispcyc2), is accumulated according to row 2 of TABLE 4 for the LCP2$_2$ iterations of FIG. 10 virtualized processing. In the particular example of FIG. 10, the utilization values LCPdispcyc1 and LCPdispcyc2 are used for statistical reporting purposes only.

In an alternate embodiment, however, where control of each logical processor (LCP) is desired, a minimum value, LCPdispmin, and a target value, LCPdisptgt is defined for each logical processor (LCP). For example, for LCP1$_2$ and LCP2$_2$ the minimum values are designated as LCPdispmin1 and LCPdispmin2, respectively, and the target values are designated as LCPdisptgt1 and LCPdisptgt2, respectively. Accordingly, utilization analysis, analogous to level L6 of FIG. 10 for logical processor LCP1$_2$ is based upon the tests LCPdispcyc1<LCPdispmin1? and LCPdispcyc1>LCPdisptgt1? and for logical processor LCP2$_2$ is based upon the tests LCPdispcyc2<LCPdispmin2? and LCPdispcyc2>LCPdisptgt2?.

In the particular example described with the target, LCPdisptgt1, for LCP1$_2$ equal to 10% and the target, LCPdisptgt2, for LCP2$_2$ equal to 20%, the minimum, LCPdispmin1, for LCP1$_2$ could be set equal to 8% and the minimum, LCPdispmin2, for LCP2$_2$ could be set equal to 18%.

An algorithm similar to FIG. 10 is used in a non-operating state, omitting the WAIT state portion of the utilization analysis in the virtualization processing, and not modifying the LCP timer, since the logical processor (LCP) is effectively already undispatched as far as the operating system is concerned. The purpose of the virtualization processing in this case is merely to keep the dispatch cycle accounting straight until such time as the LCP may resume operating.

Figure 11:
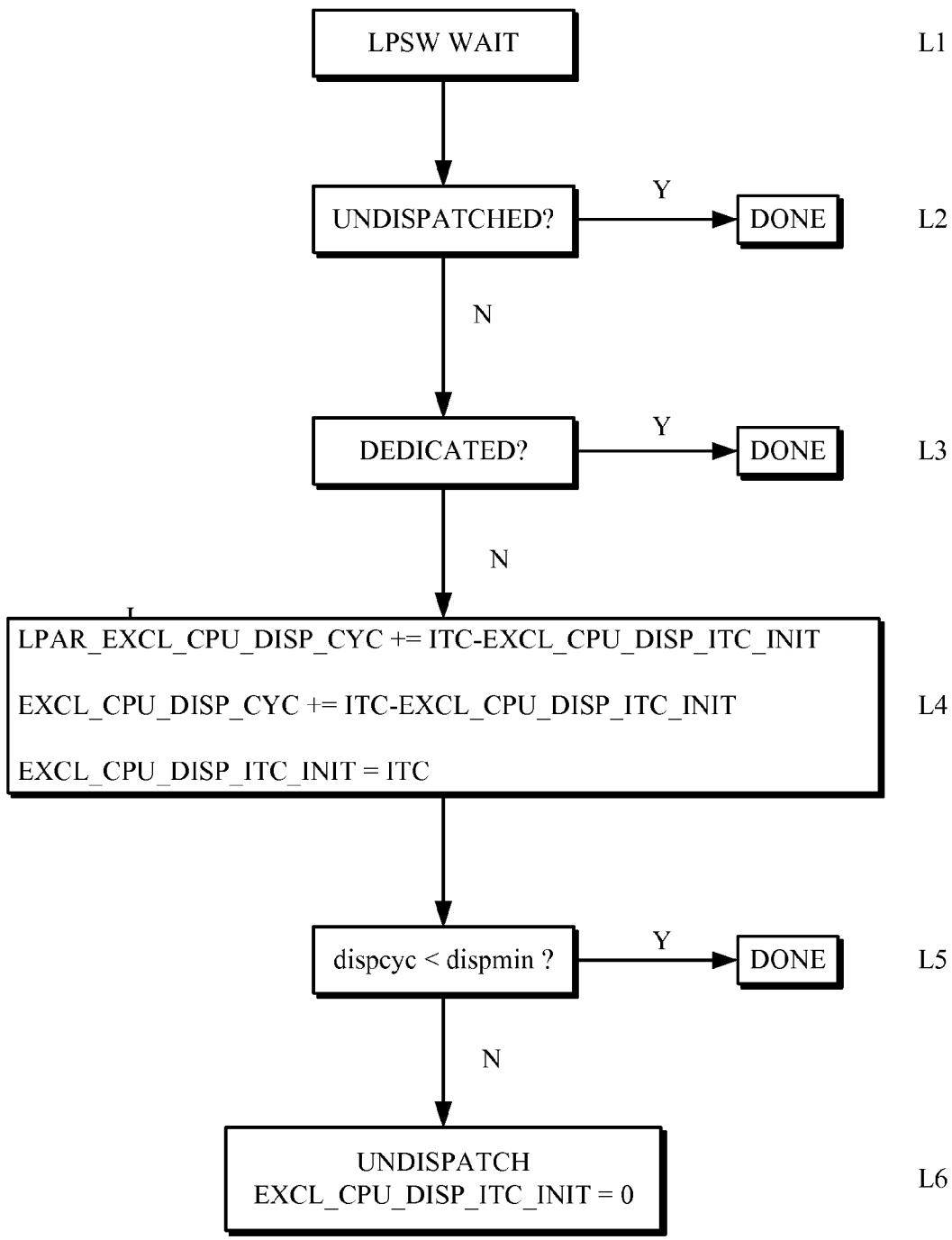
FIG. 11 depicts the virtualization processing in the FIG. 7 computer system executed for each logical processor (LCP) during WAIT states.

In FIG. 11, the objective for LPSW WAIT processing is to undispatch the LCP if appropriate. Whenever the processing of the system of FIG. 1 is in the LPSW WAIT state of level L1 of FIG. 11, the LCP test UNDISPATCHED? of level L2 is made. The SWAPOK test of FIG. 10 is not needed because the impact on timing is assumed to be negligible. If the undispatched test result is yes (Y), the processing is DONE for the current FIG. 11 iteration. If the undispatched test result is no (N), the level L3 test DEDICATED? is made. If the dedicated test result is yes (Y), the processing is DONE for the current FIG. 11 iteration. If the result of the dedicated test is no (N), an updating is done in level L4. The updating in level L4 of FIG. 11 is the same as the updating of level L5 in FIG. 10 as described in connection with TABLE 4.

After updating of level L4 in FIG. 11, the simplified utilization analysis of level L5 is performed. The utilization analysis test dispcyc<dispmin? determines whether the utilization of the logical processor LCP is below the minimum, dispmin. If the result is yes (Y), processing is DONE and the LCP remains dispatched. The LCP timer is not stopped in this case, to facilitate utilization analysis by the separate operating system image occupying each LPAR. If the utilization is above the minimum with a test result no (N) in level L5, the processing in level L6 undispatches the logical processor (LCP) and sets the start value of the dispatch interval timer to zero (EXCL_CPU_DISP_ITC_INIT=0).

While the invention has been particularly shown and described with reference to preferred embodiments thereof it will be understood by those skilled in the art that various changes in form and details may be made therein without departing from the scope of the invention.

The invention claimed is:

1. A computer system comprising,
   a plurality of physical processors,
   a plurality of logical processors,
   a plurality of logical partitions each including one or more of the logical processors, and
   a control element for controlling the virtualization of the physical processors, the logical partitions and the logical processors, said control element operating to exclusively bind logical processors of logical partitions to physical processors, and wherein responsive to utilization, dispcyc, of a logical partition of the plurality of logical partitions being between a minimum, dispmin, for the logical partition utilization and a target, disptgt, for the logical partition utilization, the control element is to:

undispatch a dispatched logical processor of the logical partition from a physical processor, responsive to the logical processor being in a WAIT state; and dispatch an undispatched logical processor of the logical partition to a physical processor, responsive to the logical processor not being in a WAIT state.

2. The computer system of claim 1 wherein the control element operates for exclusively binding all of the logical processors of a logical partition.

3. The computer system of claim 1 wherein the control element includes partition resource maps for partitioning the computer system into the logical partitions that exclusively bind the logical processors to the physical processors.

4. The computer system of claim 1 wherein for each logical partition the control element, establishes sharing intervals during which the logical processors of the logical partition are dispatched during dispatch times and are undispatched during undispatched times on the physical processors, accumulates a logical partition utilization by accumulating the dispatch times of all logical processors of the logical partition.

5. The computer system of claim 4 wherein the control element sets the target, disptgt, for the logical partition utilization, dispcyc, and wherein the dispatching and undispatching of each logical processor of the logical partition is based upon a comparison of the target, disptgt, and the logical partition utilization, dispcyc.

6. The computer system of claim 4 wherein the control element sets the minimum, dispmin, for the logical partition utilization, dispcyc, and wherein the dispatching and undispatching of each logical processor of the logical partition is based upon a comparison of the minimum, dispmin, and the logical partition utilization, dispcyc.

7. The computer system of claim 4 wherein the control element, sets the minimum, dispmin, for the logical partition utilization, dispcyc, and wherein the dispatching and undispatching of each logical processor of the logical partition is based upon a comparison of the minimum, dispmin, and the logical partition utilization, dispcyc, and sets the target, disptgt, for the logical partition utilization, dispcyc, and wherein the dispatching and undispatching of each logical processor of the logical partition is based upon a comparison of the target, disptgt, and the logical partition utilization, dispcyc.

8. The computer system of claim 7 wherein the control element, dispatches an undispatched logical processor if dispcyc<dispmin, and undispatches a dispatched logical processor if dispcyc>disptgt.

9. The computer system of claim 1 wherein for each logical partition, the control element, establishes sharing intervals of time for the logical partition, establishes swap intervals of time during each sharing interval, dispatches and undispatches the logical processors to the physical processors for selected ones of the swap intervals, accumulates a logical partition utilization based on accumulated dispatch times for all logical processors of the logical partition over each sharing interval.

10. The computer system of claim 9 wherein the computer system actual utilization is the sum of the logical partition utilizations of all the logical partitions.

11. The computer system of claim 10 wherein the computer system actual system utilization does not exceed a defined total system utilization.

12. The computer system of claim 1 wherein the control element includes a sharing interval timer for establishing, for each logical processor, sharing intervals and a swap interval timer for establishing, for each logical processor, swap intervals during each sharing interval and wherein dispatching and undispatching of each logical processor of the logical partition occurs for swap intervals.

13. The computer system of claim 12 wherein the control element includes a swap flag for each logical processor and wherein the control element sets the swap flag at the end of each swap interval and resets the swap flag at the start of virtualization processing for the logical processor to ensure that at least one swap interval elapses between a dispatch or undispatch of the logical processor.

14. The computer system of claim 1 having an interrupt facility for interrupting the computer system for processing interrupts and wherein the control element causes an interrupt for virtualized processing of each logical processor.

15. The computer system of claim 1 wherein the physical processors have physical processor performances and wherein for each logical partition, the control element, assigns logical partition utilization values for the logical partition, controls the dispatching and undispatching of each logical processor of the logical partition based on the logical partition utilization values so as to enable logical processors of the logical partition to fractionally time-share physical processor performances.

16. The computer system of claim 15 wherein the logical partition utilization values are the minimum, dispmin, and the target, disptgt.

17. The computer system of claim 16 wherein the dispatching and undispatching of each logical processor of the logical partition is based upon a first-come first-served basis among logical processors of the logical partition whereby logical processor utilization for each logical processor is a function of demands for processing from each logical processor.

18. A central processing complex computer system comprising, a plurality of physical processors, a plurality of logical processors, a plurality of logical partitions each including one or more of the logical processors, a system assist processor having a control element for controlling the virtualization of the physical processors, the logical partitions and the logical processors, said control element exclusively binding logical processors of logical partitions to particular ones of the physical processors, said control element including, a sharing interval timer for establishing, for each logical processor, sharing intervals, a swap interval timer for establishing, for each logical processor, swap intervals during each sharing interval, an interval timer counter having an ITC count incremented by clock cycles, a swap flag set at the end of each swap interval, said control element operating to execute virtualization processing for each logical processor of a logical partition including the processing levels, level L1, causing an interrupt for starting the virtualization processing for a particular logical processor and proceeding to a next level of virtualization processing, level L2, testing if the swap flag is set and if no (N), terminating the virtualization processing and if yes (Y), resetting the swap flag and proceeding to a next level of virtualization processing, level L3, testing if the logical processor is dedicated and if yes (Y) proceeding to a level L7 of virtualization processing, and if no (N) proceeding to a next level of virtualization processing, level L4, testing if the logical processor is dispatched and if no (N), proceeding to a level L6 of virtualization processing and if yes (Y), proceeding to a next level of virtualization processing, level L5, updating a logical partition incrementer to be equal to the ITC count minus an initial value, of a logical processor dispatch count and resetting the initial value to the ITC count and proceeding to a next level of virtualization processing, level L6, test minimum utilization (dispcyc<dispmin?) to determine if the logical partition utilization, dispcyc, is below the minimum, dispmin, and if yes (Y) proceed to a next level of virtualization processing and if no (N), test target utilization (dispcyc>disptgt?) to determine if the logical partition utilization, dispcyc, is above the target, disptgt, and proceed to a next level of virtualization processing, level L7, if logical partition utilization, dispcyc, tested below the minimum, dispmin, in level L6 or the logical processor was deter-mined to be dedicated in level L3, a dispatched test is made to determine if the logical processor is dispatched and if yes (Y), terminating the virtualization processing and if no (N), proceeding to a next level of virtualization processing, and if logical partition utilization, dispcyc, tested greater than the target utilization, disptgt, in level L6, an undispatched test is made to determine if the logical processor is undispatched and if yes (Y), terminating the virtualization processing and if no (N) proceeding to a next level of virtualization processing, if logical partition utilization, dispcyc, tested less than the target utilization, disptgt, in level L6, a wait state test is made to determine if the logical processor is in a wait state and if yes (Y), proceeding to the undispatched test in level L7 and if no (N) proceeding to the dispatched test in level L7, level L8, if the undispatched test in level L7 is no (N), the dispatch interval is ended and the logical processor is undispatched, the initial value of the dispatch counter is cleared to 0, the logical processor timer if started is if stopped and the processing loops back to level L1, if the result of the dispatched test in level L7 is no (N), the logical processor is dispatched, the initial value at the start of a dispatch interval is set equal to the ITC count, the logical processor timer is started if stopped and processing continues.

\* \* \* \* \*